US008706118B2

(12) United States Patent
Jaiswal et al.

(10) Patent No.: US 8,706,118 B2
(45) Date of Patent: Apr. 22, 2014

(54) 3G LTE INTRA-EUTRAN HANDOVER CONTROL USING EMPTY GRE PACKETS

(75) Inventors: Suraj Jaiswal, Santa Clara, CA (US); Renhua Wen, San Ramon, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 149 days.

(21) Appl. No.: 13/227,182

(22) Filed: Sep. 7, 2011

(65) Prior Publication Data

US 2013/0058308 A1 Mar. 7, 2013

(51) Int. Cl.
*H04W 36/00* (2009.01)

(52) U.S. Cl.
CPC .............................. *H04W 36/0016* (2013.01)
USPC ........................................ 455/436; 370/331

(58) Field of Classification Search
CPC ........... H04L 47/825; H04W 36/0016; H04W 36/0027
USPC ......................................................... 455/436
See application file for complete search history.

(56) References Cited

U.S. PATENT DOCUMENTS

| 2002/0154653 | A1* | 10/2002 | Benveniste | 370/447 |
|---|---|---|---|---|
| 2008/0281978 | A1* | 11/2008 | Tang et al. | 709/232 |
| 2010/0111041 | A1* | 5/2010 | Lim et al. | 370/331 |
| 2010/0142488 | A1* | 6/2010 | Zhang et al. | 370/332 |
| 2011/0255471 | A1* | 10/2011 | Sundell et al. | 370/328 |
| 2011/0269495 | A1* | 11/2011 | Hapsari et al. | 455/517 |
| 2011/0317658 | A1* | 12/2011 | Tooyama et al. | 370/331 |
| 2012/0177002 | A1* | 7/2012 | Faucher et al. | 370/331 |
| 2012/0252355 | A1* | 10/2012 | Huang et al. | 455/7 |
| 2012/0294276 | A1 | 11/2012 | Jaiswal et al. | |
| 2012/0294277 | A1 | 11/2012 | Jaiswal et al. | |

FOREIGN PATENT DOCUMENTS

| WO | WO 2010/074143 A1 * | 1/2010 | H04W 36/02 |
|---|---|---|---|
| WO | WO 2010/066985 * | 6/2010 | H04W 36/02 |
| WO | WO 2010/069402 * | 6/2010 | H04W 36/00 |
| WO | WO 2010/069985 A1 | 6/2010 | |

OTHER PUBLICATIONS

3GPP TS 29.281, version 9.3.0; Universal Mobile Telecommunication System (UMTS); LTE; General Packet Radio System (GPRS) Tunneling Protocol User Plane (GTPv1-U) (Jun. 2010).*

(Continued)

*Primary Examiner* — Huy D Vu
*Assistant Examiner* — Benjamin Lamont (57) ABSTRACT

Empty GRE packets are used to ensure in-order delivery of data packets for a session to a UE during intra-EUTRAN handover involving SGW relocation. In particular, a PGW sends an empty GRE packet per PDN session of the UE to a source SGW upon handover execution to indicate the end of pre-handover data packets delivered to the source SGW. Upon receipt of the empty GRE packet, the source SGW generates an end marker packet, and sends it to the source eNodeB. The source eNodeB forwards buffered, pre-handover data packets not delivered to the UE, followed by the end marker packet, to the target eNodeB, either directly (X2 interface) or indirectly (GTP-U tunnel between source and target SGWs). The target eNodeB then sends the pre-handover data packets, and post-handover data packets delivered to it by the PGW, to the UE in order, in reliance on the end marker packet.

16 Claims, 12 Drawing Sheets

(56) References Cited

OTHER PUBLICATIONS

Catt, End Marker During Handover Procedure with Serving GW Change, S2-084884, 3GPP TSG SA WG2 Meeting #66, 23.401 CR 0363, revision 1, version 8.2.0, Montreal, Canada, Jun. 23-27, 2008 pp. 1-10.*

Catt: "End Marker support during Intra-EUTRAN handover procedure", 3GPP Draft; S2-084883, 3rd Generation Partnership Project (3GPP), Mobile Competence Centre; 650, Route Des Lucioles ; F-06921 Sophia-Antipolis Cedex; France, vol. SA WG2, no. Montreal; 20080618, Jun. 18, 2008, XP050266971, the whole document.

Racz A. et al. "Handover Performance in 3GPP Long Term Evolution (LTE)", Mobile and Wireless Communications Summit, 2007. 16$^{th}$ IST, Jul. 1-5, 2007, the whole document.

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), dated Jun. 24, 2011, the whole document.

3GPP TS 23.401 V9.9.0 (Jun. 2011) 3rd Generation Partnership Project; Technical Specification Group Services and System Aspects; General Packet Radio Service (GPRS) enhancements for Evolved Universal Terrestrial Radio Access Network (E-UTRAN) access (Release 9), dated Jun. 12, 2012, the whole document.

3GPP TS 23.402 V9.9.0 (Jun. 2011); 3rd Generation Partnership Project; Technical Specification Group Services and System Aspects; Architecture enhancements for non-3GPP accesses (Release 9), dated Jun. 12, 2011, the whole document.

* cited by examiner

3G LTE INTRA-EUTRAN HANDOVER CONTROL USING EMPTY GRE PACKETS

FIELD OF THE INVENTION

The invention disclosed herein generally relates to an intra-EUTRAN handover of a User Equipment involving Serving Gateway relocation, and in particular to ensuring in-order delivery of data packets during the handover using an empty Generic Routing Encapsulation packet to trigger an end marker.

BACKGROUND

The 3$^{rd}$ Generation Partnership Project (3GPP) oversees and governs 3$^{rd}$ Generation (3G) networks, including 3G Long Term Evolution (LTE) networks. 3G LTE provides mobile broadband to User Equipment (UE) within the 3G LTE network at higher data rates than generally available with other networks. For example, the air interface for 3G LTE, Evolved Universal Mobile Telecommunication System (UMTS) Terrestrial Radio Access Network (E-UTRAN), utilizes multi-antenna and multi-user coding techniques to achieve downlink data rates of 100s of Mbps and uplink data rates of 10s of Mbps.

In LTE E-UTRAN, user mobility is controlled by the network with assistance from the UE. Handover decisions, as well as the choices for the target cell and technology (when applicable), are made by the current serving Evolved Node Base Station (eNodeB), based on measurements made by the eNodeB, and also based on measurements reported by the UE to the eNodeB. Due to the nature of E-UTRAN, the number of packets buffered before scheduled transmissions occur following the handover may not be negligible. For that reason, packet forwarding mechanisms may be used, when applicable, between a pre-handover "source" node (e.g., eNodeB) and a post-handover "target" node (eNodeB, or if the radio access changes from E-UTRAN to 2G/3G, a Radio Network Controller, or RNC) so as to limit packet loss during handover from the source node to the target node.

LTE E-UTRAN provides several interfaces to reduce packet loss during handover from a source eNodeB to a target eNodeB. The X2 interface provides a direct forwarding path between the two eNodeBs. The user plane protocol stack on the X2 interface uses GPRS Tunneling Protocol User data (GTP-U) tunneling. The X2 interface is optional, and may not be available between a given source and target eNodeB. In this case, an indirect forwarding path exists over an S1-U interface between source eNodeB and source serving gateway (SGW); through network connectivity between the source SGW and target SGW; and over S1-U from the target SGW to the target eNodeB. Like X2, the user plane on the S1-U interface uses GTP-U. The network connectivity between the source and target SGW may be via a network node such as a packet data network gateway (PGW), with connections to the SGWs over an S5 (non-roaming) or S8 (roaming) interface.

Regardless of whether the data is forwarded via a direct or indirect forwarding path, the target eNodeB receives forwarded, pre-handover data packets from the source eNodeB, as well as post-handover data packets from the core network (e.g., PGW). Delays in the forwarding path may cause the target eNodeB to receive, and hence deliver to the UE, data packets that are out of order.

The 3GPP Specifications (e.g., TS 36.300 and TS 23.401) define a GTP-U "end marker" (GTP-U message type 254—referred to herein as an "end marker packet" or simply an "end marker") that delineates the end of forwarded packets, and hence prevents out-of-order delivery, for example in handover from a source eNodeB to a target eNodeB, when both are anchored by the same SGW. The GTP-U end marker mechanism may also be used across the S5/S8 interfaces, when they are implemented with the GTP-U protocol. However, in some networks, the S5/S8 interfaces are based on the Proxy Mobile IPv6 (PMIP) for the control plane, and Generic Routing Encapsulation (GRE) for the user plane. No end marker mechanism is defined for the PMIP-GRE protocol. Accordingly, in an intra-EUTRAN handover with SGW relocation, at least where the S5/S8 interfaces use PMIP-GRE, the target eNodeB may deliver data packets to a UE out of order.

One possible solution to this problem would be to insert sequence numbers in the header of each data packet. While such sequence numbers would enable the target eNodeB to determine the correct order for transmitting the data packets to a UE, using such sequence numbers would undesirably increase the overhead and signal processing associated with the transmission of each data packet.

SUMMARY

Embodiments of the invention disclosed herein use one or more empty GRE packets to ensure in-order delivery of data packets for a session to a UE during intra-EUTRAN handover involving SGW relocation. In particular, a PGW sends an empty GRE packet for each PDN session of the UE to a source SGW as part of handover completion to indicate the end of pre-handover data packets that should be forwarded from the source eNodeB to a target eNodeB. Upon receipt of the empty GRE packet, the source SGW generates one or more end marker packet for each bearer of a PDN connection (UE session), and sends it to the source eNodeB. The source eNodeB forwards buffered, pre-handover data packets not delivered to the UE, followed by the end marker packet, to the target eNodeB, either directly (X2 interface) or indirectly (GTP-U tunnel between source and target SGW). The target SGW then sends the forwarded data packets, end marker packet, and post-handover network packets received from PGW to the target eNodeB, which is able to deliver all the data packets to the UE in order, in reliance on the end marker packet.

The PGW and source SGW cooperate to implement the intra-EUTRAN handover with SGW relocation described herein. After receiving handover instructions, the PGW sends one or more empty GRE packets to the source SGW to indicate the end of the data packets being sent by the PGW to the source SGW. The PGW sends one or more empty GRE packets for each PDN session of the UE. The PGW subsequently sends one or more data packets for the session directly to the target SGW, where the post-handover data packets are sequentially ordered relative to the pre-handover data packets sent to the source SGW.

The source SGW sends the data packets to the source eNodeB. Responsive to receiving an empty GRE packet, the source SGW generates and sends an end marker packet to the source eNodeB. If the session includes multiple bearer streams, the source SGW sends an end marker packet for each bearer stream, after receiving an empty GRE packet for the session. The end marker packet indicates to the target eNodeB the end of the forwarded packets for the session (or, for that matter the end of the forwarded packets for the bearer when end marker packet is per bearer). The source eNodeB may forward the data packets and end marker packet to the target eNodeB directly (X2) or indirectly (GTP-U Tunnel between source and target SGW).

DETAILED DESCRIPTION

Embodiments of the present invention disclosed herein use empty GRE packets to ensure in-order delivery of data packets for a session to a UE during intra-EUTRAN handover involving SGW relocation. In particular, a PGW sends an empty GRE packet to a source SGW to indicate the end of the data packets to the source SGW. The PGW then sends data packets to a target SGW. In response to receipt of the empty GRE packet, the source SGW sends an end marker packet to the source eNodeB, and the end marker packet is forwarded (following all buffered data packets at the source eNodeB) to the target eNodeB. The forwarding may be direct (X2 interface) or indirect (GTP-U tunnel between source eNodeB and source SGW, and target SGW and target eNodeB). The end marker packet allows the target eNodeB to transmit data packets to the UE in order.

Figure 1:
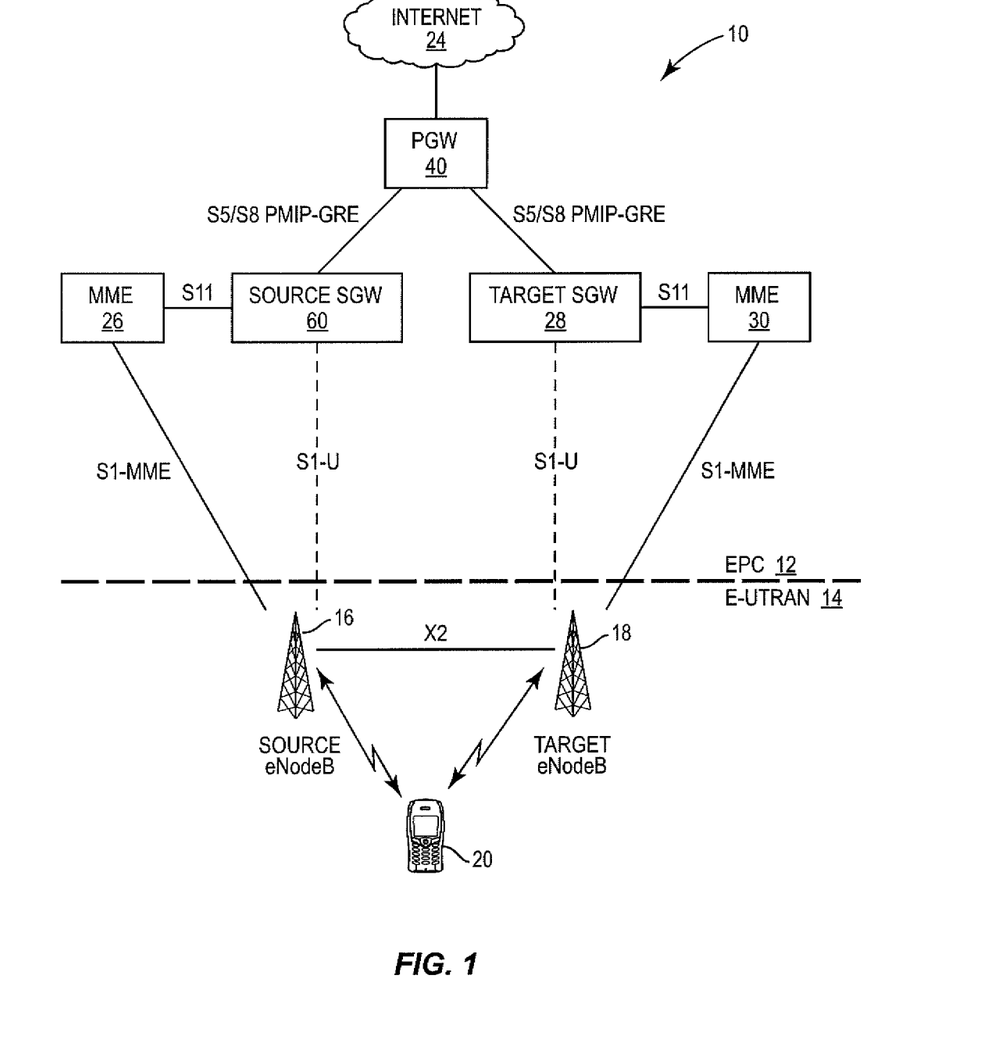
FIG. 1 is a functional block diagram of relevant nodes of a 3G LTE wireless communication network.

FIG. 1 depicts a 3G LTE wireless network 10, comprising an Evolved Packet Core (EPC) 12 and an Evolved-UMTS Terrestrial Access Network (E-UTRAN) 14. The E-UTRAN 14 includes a User Equipment (UE) 20 (in this case, a mobile terminal, such as a cellular telephone or "smartphone") in handover from a source Evolved Node Base Station (eNodeB) 16 to a target eNodeB 18. The eNodeB 16, 18 is the access points for UE connectivity to the network 10. The eNodeB 16, 18 is similar to a base station in 3G/UMTS networks, but in addition to having Layer 1 and Layer 2 functionality, it also has Layer 3 functionality so that it can connect directly to the core of the network, rather than through a controller, as base stations do in 3G/2G networks.

The EPC 12 includes a Packet Data Network Gateway (PGW) 40 interfacing to a Packet Data Network 24, such as the Internet, and connected to a source Serving Gateway (SGW) 60 and a target SGW 28 via S5/S8 PMIP-GRE interfaces. Associated with each SGW 60, 28, is a Mobility Management Entity (MME) 26, 30. The SGW 60, 28 is the termination point of the packet data interface to the E-UTRAN access network 14. When a UE 20 moves across eNodeBs 16, 18 in the E-UTRAN 14, the SGW 60, 28 serves as the local mobility anchor point routing packets towards the UE 20 for intra E-UTRAN mobility as well as mobility with other 3GPP technologies. The MME 26, 30 is in charge of the control plane functions related to subscriber and session management. Other EPC 12 nodes, such as a Policy Charging and Rules Function (PCRF) node, Authentication, Authorization and Accounting (AAA) node, and the like, are not depicted in FIG. 1 for clarity.

The EPC 12 depicted in FIG. 1 applies to both roaming and non-roaming scenarios, where the S5 interface between the PGW 40 and the SGWs 60, 28 applies to non-roaming scenarios, and the S8 interface between the PGW 40 and SGWs 60, 28 applies to roaming scenarios.

During a handover operation, the PGW 40 provides data packets for a session to, alternately, the serving SGW 60 and the target SGW 28 via the S5 (non-roaming) or S8 (roaming) interface. In either case, the protocol on the S5/S8 may comprise Proxy Mobile IPv6 (control plane) and Generic Routing Encapsulation (user plane), or PMIP-GRE. The SGWs 60, 28 route data packets to their respective eNodeBs 16, 18 of the E-UTRAN 14 via the S1-U interface, using the GPRS Tunneling Protocol User data (GTP-U) tunneling protocol. Other interfaces depicted in FIG. 1 are not germane to embodiments of the present invention.

Unlike WCDMA networks, in 3G LTE there is no soft handover support. At each handover the user context, including user plane packets and control plane context, must be relocated from a pre-handover, or "source" eNodeB 16 to the post-handover, or "target" eNodeB 18. E-UTRAN mobility uses a "make-before-break" approach to reduce packet loss during the handover.

The handover process has three distinct phases—handover preparation, handover execution and handover completion. In the handover preparation phase, the UE 20 information is registered with the target network, and appropriate context information is transferred to the target network, before the UE 20 initiates signaling to the target eNodeB 18. The handover execution phase requires the UE 20 to switch from the source eNodeB 16 to the target eNodeB 18. This involves L1/L2 access procedures and is estimated to take an average of 10-30 ms, known as the "Radio Interruption Time." The UE 20 cannot receive any data packets during this time, as it has no radio connectivity to the system (having disconnected from the source eNodeB 16 but not completed connection to the target eNodeB 18). The handover completion phase completes the handover in the core network 12.

The source eNodeB 16 buffers the data packets for the duration the UE 20 is not reachable and has not confirmed its attachment to the target eNodeB 18. Upon confirmation of attachment of the UE 20 to the target network, the source eNodeB 16 starts to forward the buffered data packets. The source eNodeB 16 decides which of the EPS bearers are to be subjected to data forwarding from the source eNodeB 16 to the target eNodeB 18. The core network 12 does not change the decisions taken by the source eNodeB 16.

The service quality experienced by the end user during handover is affected by: the Radio Interruption Time (or Detach Time) during which the UE 20 is not connected to the system 14; the amount of discarded downlink data in case no forwarding is available, or the delay of the forwarded packets if forwarding is available; the delay difference between the network path and forwarded path to the target eNodeB 18; and the amount of discarded uplink (UL) packets.

Figure 2A:
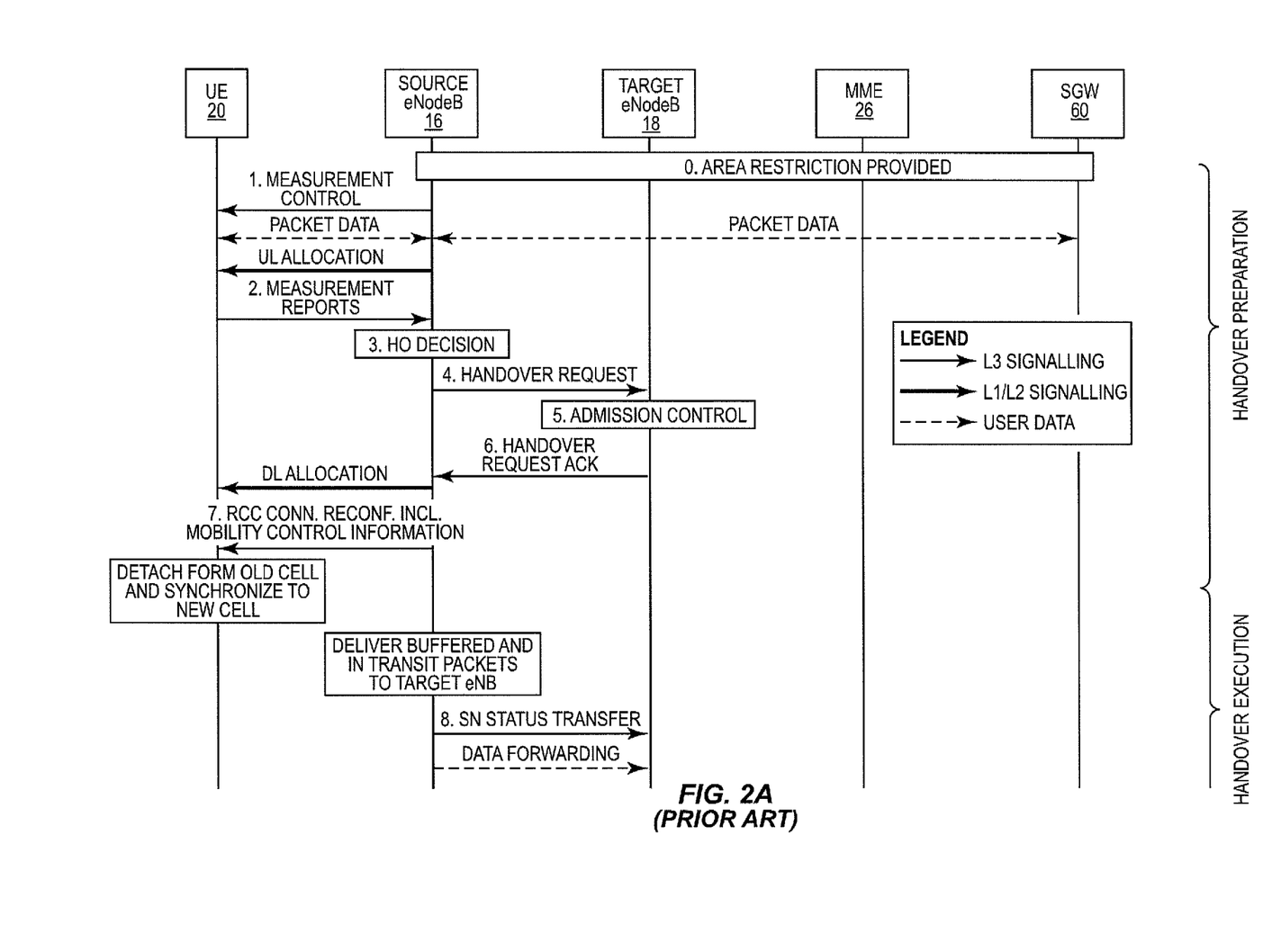
FIG. 2 is a call signaling diagram depicting a prior art handover process.
Figure 2B:
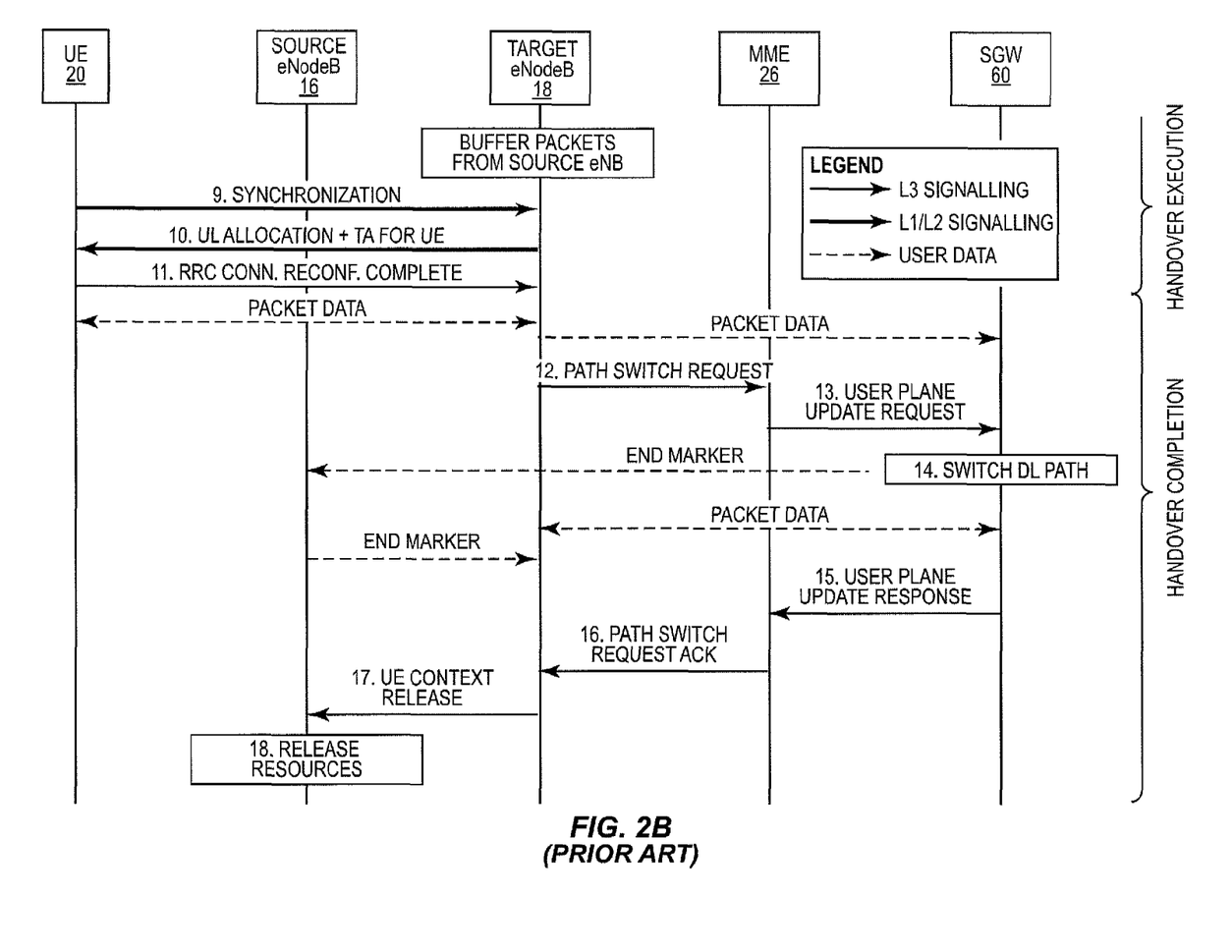

FIG. 2 depicts the call signaling for an X2-based intra-EUTRAN handover between eNodeBs anchored at the same SGW 60, 28, as known in the art. The intra-EUTRAN handover can be X2-based or S1-U interface based. In the X2-based handover, the EPC 12 is not involved in the handover preparation phase. That is, preparation messages are directly exchanged between the eNodeBs 16, 18, (e.g., messages 5 and 6 in FIG. 2). The source and target eNodeBs 16, 18 make the decision for the handover. Also, during the handover execution phase, the packets are forwarded directly from source eNodeB 16 to the target eNodeB 18 over the X2 interface.

When data forwarding cannot be performed over the X2-interface, an S1-U based handover is used. An S1-U based handover involves the EPC 12 during the handover preparation phase. The S1-U handover can be triggered, e.g., by no X2 connectivity to the target eNodeB 18, or by an error indication from the target eNodeB 18 after an unsuccessful X2-based handover, or by dynamic information acquired by the source eNodeB 16, or when MME 26, 30 functionality must be relocated. The packets can be forwarded either directly over the X2-interface or indirectly via source SGW 60 and target SGW 28 to the target eNodeB 18.

In either case (that is, for either X2-based or S1-U interface based handover), according to embodiments of the present invention, when an intra-EUTRAN handover includes SGW relocation, the PGW 40 ensures in-order deliver of packets by the target eNodeB 18 by using an empty GRE packet to trigger the generation of an end marker packet by the source SGW 60.

When the SGW is relocated (i.e., from source SGW 60 to target SGW 28), the PGW 40 is the location where the tunnel switch is performed, while the target SGW 28 anchors the relocated sessions. The target SGW 28 has no knowledge of the tunnel switch epoch and the downlink GRE key (on the source SGW 60) when S5/S8 interface is PMIP-GRE based. Therefore, PGW 40 is the best anchor point to signal the end of transmission of user plane packets to the source SGW 60.

In one embodiment, upon receiving the Proxy Binding Update, the PGW 40 will update the UE context with the new information received in the Proxy Binding Update message. This includes a new downlink GRE key for the session towards the target SGW 28. Before performing the user plane tunnel switch by overwriting the current downlink GRE key towards the source SGW 60 with the new downlink GRE key towards the target SGW 28, the PGW 40 will send one or more empty GRE packets for the UE session towards the source SGW 60. Upon receiving the empty GRE packets, the source SGW 60 generates and transmits one or more end marker packets per bearer of the UE session.

As used herein, an empty GRE packet means a GRE packet with no data payload. By sending an empty GRE packet as an end-of-data indicator, no new protocol definition is required, and embodiments of the present invention may be implemented on standard equipment, including in deployed networks 10. Since the PGW 40 under normal circumstances would never send a GRE packet with no data payload (this would represent pure overhead with no benefit, and hence a waste of limited network resources), the risk of a "false positive" indication to the source SGW 60 is virtually zero.

The known problem of potentially dropped packets may be guarded against by the PGW 40 sending multiple, i.e., up to three, empty GRE packets for each PDN session. In one embodiment, the empty GRE packets are sent with increasing delay between the transmissions. Since the first, as well as subsequent, empty GRE packets, and hence end marker packets, are sent after all pre-handover data packets, redundancy in the "end of pre-handover data" indication is not detrimental to maintaining packet ordering at the target eNodeB 18. In the discussion herein, for simplicity, only one empty GRE packet per UE PDN session and end marker packet per bearer stream are assumed.

Figure 3A:
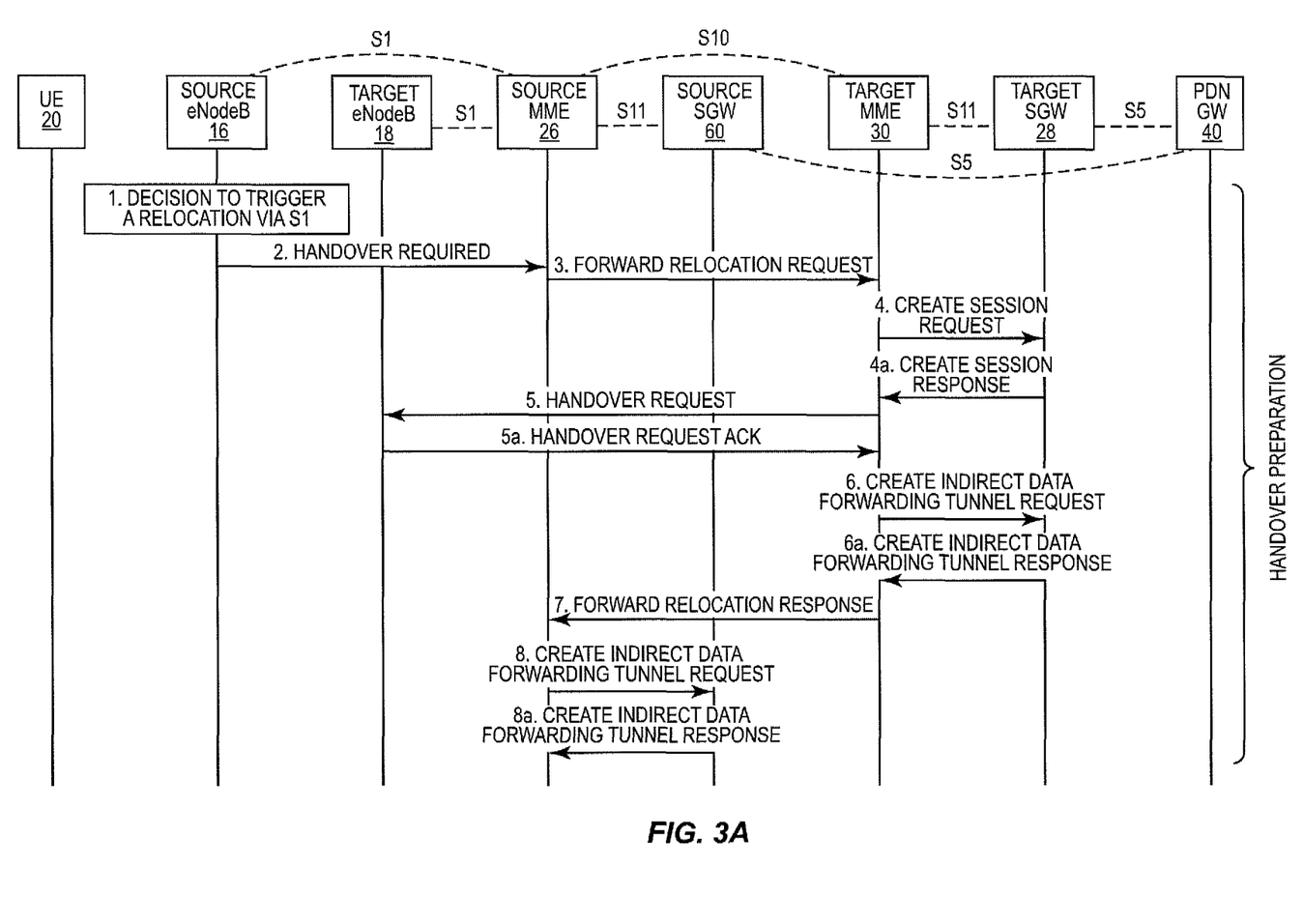
FIG. 3 is a call signaling diagram depicting a handover process using an empty GRE packet to generate an end marker packet.
Figure 3B:
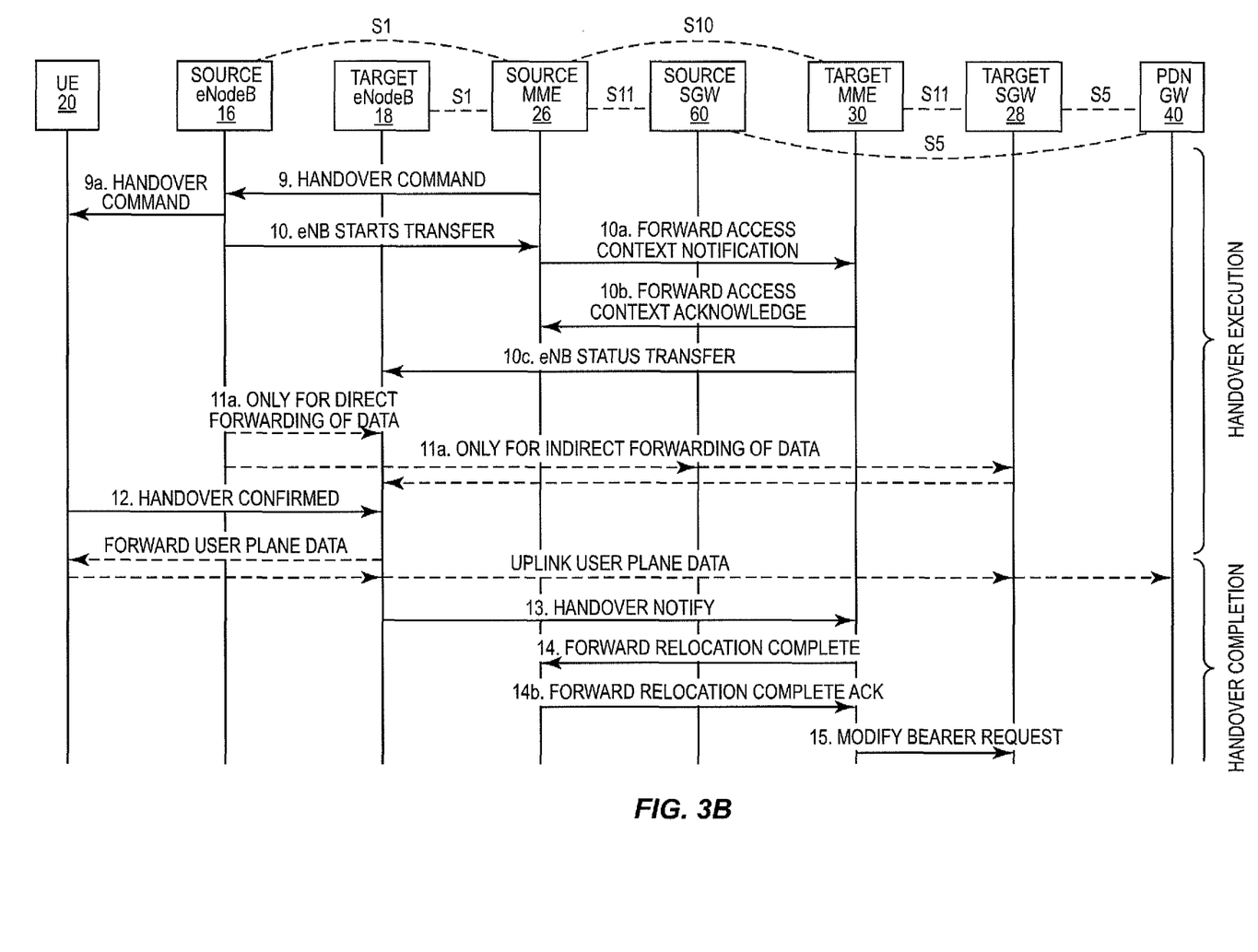
Figure 3C:
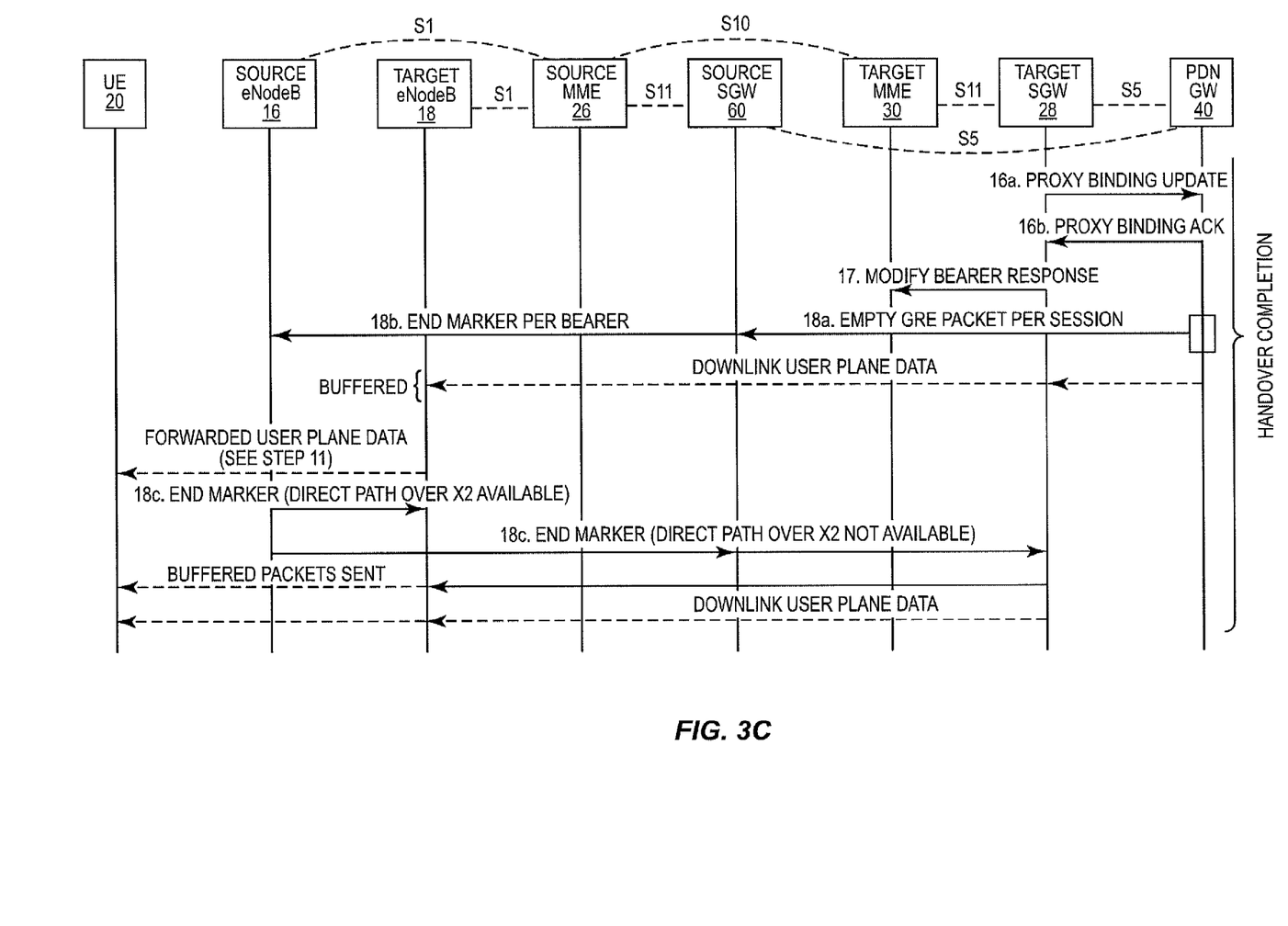

The use of an empty GRE packet is illustrated in FIG. 3. At step 18a, the PGW 40 user plane transmits an empty GRE packet for each session of the UE to the remote GRE tunnel endpoint on the source SGW 60, before switching the tunnel towards the target SGW 28. The PGW 40 will transmit the empty GRE packet as the last packet for the session over the S5/S8 interface just before switching that session towards the remote GRE tunnel on the target SGW 28.

At step 18b, after the reception of the empty GRE packet for the UE session, the source SGW 60 will transmit, for each bearer subject to data forwarding, an end marker GTP-U packet on the S1-U interface towards the source eNodeB 16 (the source SGW 60 will repeat the transmission of end markers per bearer for each empty GRE packet received for the session from the PGW 40).

Two alternatives are depicted for step 18c. If the handover is X2-based, the source eNodeB 16 receives the GTP-U end marker packet and then forwards it to the target eNodeB 18 over the X2 interface (after forwarding all user payload data packets). Alternatively, if the handover is S1-U based, and no direct forwarding path is available, the source eNodeB 16 returns the data packets and end marker to the source SGW 16 over the indirect GTP tunnel; the source SGW 60 then forwards the data and end marker to the target SGW 28 over a GTP tunnel; and the target SGW 28 forwards the data and end marker to the target eNodeB 18 over S1-U GTP tunnel. The target eNodeB 18 then delivers all of the packets, in proper order (in reliance on the end marker) to the UE 20.

Figure 4:
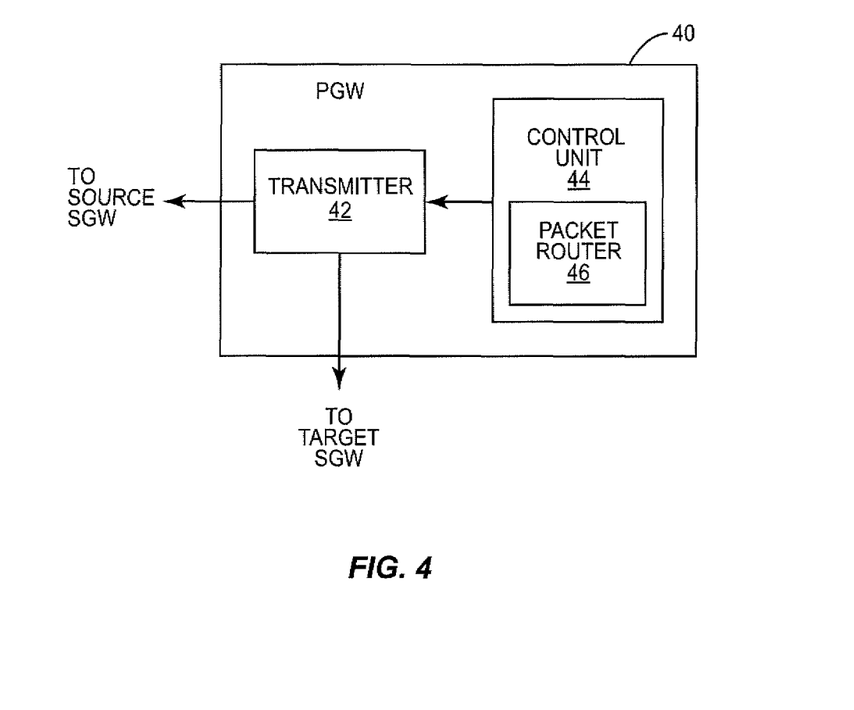
FIG. 4 is a functional block diagram of relevant portions of a packet data network gateway.
Figure 5:
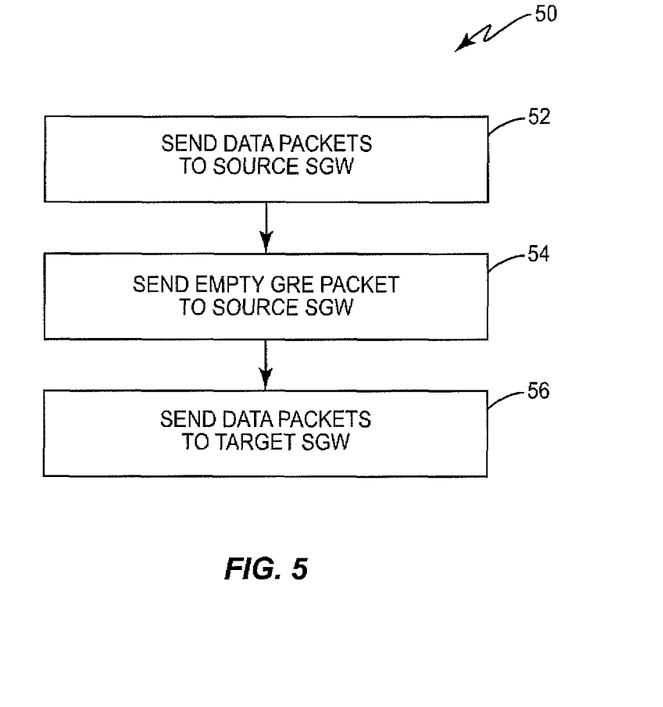
FIG. 5 is a flow diagram depicting an exemplary method of intra-EUTRAN handover as implemented by the packet data network gateway of FIG. 4.

FIGS. 4 and 5 respectively describe intra-EUTRAN handover operations that include a SGW relocation from the perspective of the PGW 40 and a method 50 implemented by the PGW 40. The PGW 40 comprises a transmitter 42 and a control unit 44. The transmitter 42 initially sends data packets, e.g., GRE data packets, for the session to the source SGW 60, according to 3GPP protocols (block 52). The control unit 44 generally controls the operation of the PGW 40, and includes a packet router 46 to control packet transmissions before, during, and after handover. More particularly, after the transmitter 42 sends the last GRE data packet to the source SGW 60, the packet router 46 controls the transmitter 42 to send an empty GRE packet, indicating the end of the data packets to the source SGW 60 for the session (block 54).

After the empty GRE packet is sent to the source SGW 60, the packet router 46 controls the transmitter 42 to send data packets for the session, e.g., GRE data packets, to the target SGW 28 (block 56). The data packets sent to the target SGW 28 are sequentially ordered relative to the data packets sent to the source SGW 60.

The control unit 44 (and hence the packet router 46) may comprise a dedicated state machine; programmable logic together with appropriate firmware; appropriate software modules executed on a general-purpose controller, such as a microprocessor or Digitial Signal Processor (DSP); or any combination of these technologies. Software implementations may be stored in memory or other machine-readable media (not shown). Other elements of the PGW 40, such as an interface to the packet data network 24, are omitted for clarity.

Figure 6:
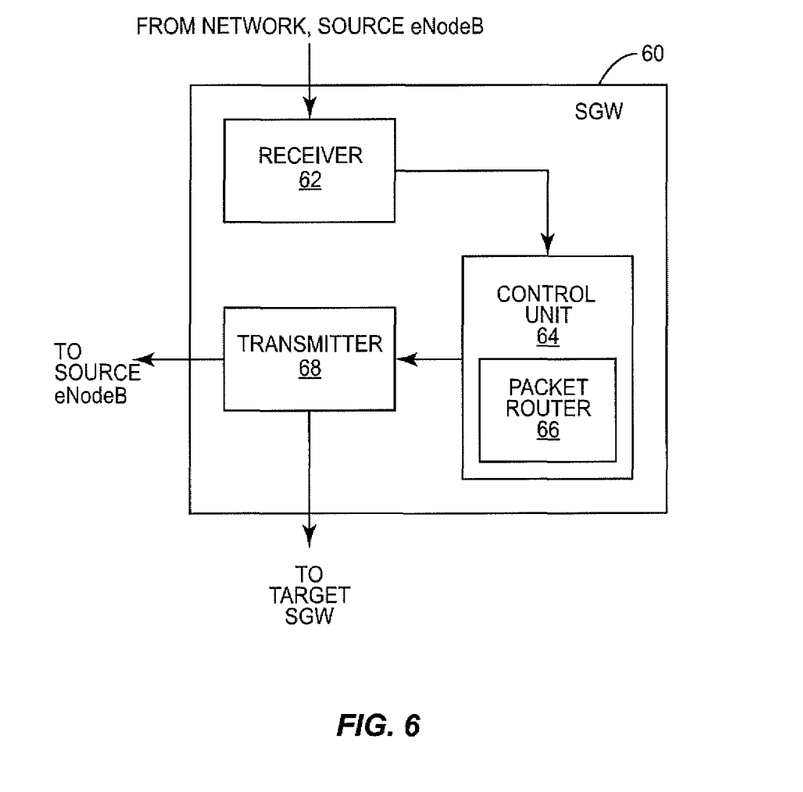
FIG. 6 is a functional block diagram of relevant portions of a source serving gateway.
Figure 7:
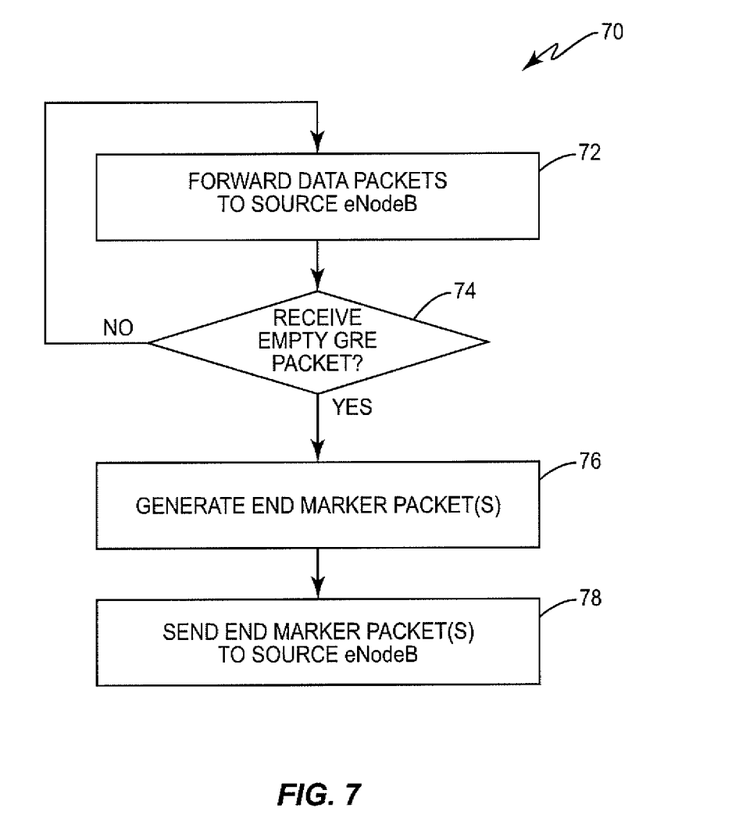
FIG. 7 is a flow diagram depicting an exemplary method of intra-EUTRAN handover as implemented by the source serving gateway of FIG. 6.

FIGS. 6 and 7 respectively describe the handover operations from the perspective of the source SGW 60 and a method 70 implemented by the source SGW 60. The source SGW 60 comprises a receiver 62, control unit 64, and transmitter 68. The receiver 62 receives data packets, e.g., GRE data packets, for the session from the PGW 40. The control unit 64 is operative to convert the GRE data packets for transmission to the source eNodeB 16, e.g., to GTP data packets. The control unit 64 comprises a packet router 66 configured to direct the received (and, if necessary, protocol-converted) data packets to the transmitter 68 for transmission to the source eNodeB 16 (block 72).

During handover, the receiver 62 also receives an empty GRE packet for the session (block 74). The control unit 64, in response to the received empty GRE packet, generates an end marker packet (GTP-U message type 254) for each bearer of the session (block 76), and sends the end marker packet to the source eNodeB 16 (block 78). Further participation in the handover procedure by the source SGW 60 may then terminate or proceed, depending on whether the source eNodeB 16 has a direct or indirect forwarding path to the target eNodeB 18.

If the source eNodeB 16 has a direct forwarding path to the target eNodeB 18 (e.g., an X2 interface between the two), then the source eNodeB 16 forwards any data packets buffered after the UE 20 disconnected, followed by the end marker packet, to the target eNodeB 18. The target eNodeB 18 transmits the forwarded data packets to the UE 20 when it attaches. When the target eNodeB 18 receives the end marker packet, it begins transmitting to the UE 20 data packets received from the target SGW 28, for each respective data stream. In this manner, the target eNodeB 18 delivers all data packets to the UE 20 in order.

If the source eNodeB 16 does not have a direct forwarding path to the target eNodeB 18, then after the UE 20 breaks its connection, the source eNodeB 16 returns any received data packets, including the end-marker packet, to the source SGW 60 (i.e., along its indirect forwarding path).

In response to receiving returned data packets from the source eNodeB 16, the packet router 66 controls the transmitter 68 to forward the data packets, followed by the end marker packet, to the target SGW 28. The target SGW 28 then forwards the data packets and the end marker packet to the target eNodeB 18. The target eNodeB 18 also receives post-handover data packets received from the EPC 12 (e.g., the PGW 40). By using the end marker packet received from the source SGW 60, the target eNodeB 18 may transmit all pre- and post-handover packets to the UE 20 in proper order.

The control unit 64 (and hence the packet router 66) may comprise a dedicated state machine; programmable logic together with appropriate firmware; appropriate software modules executed on a general-purpose controller, such as a microprocessor or Digital Signal Processor (DSP); or any combination of these technologies. Software implementations may be stored in memory or other machine-readable media (not shown). Other elements of the source SGW 60 are omitted for clarity.

Figure 8:
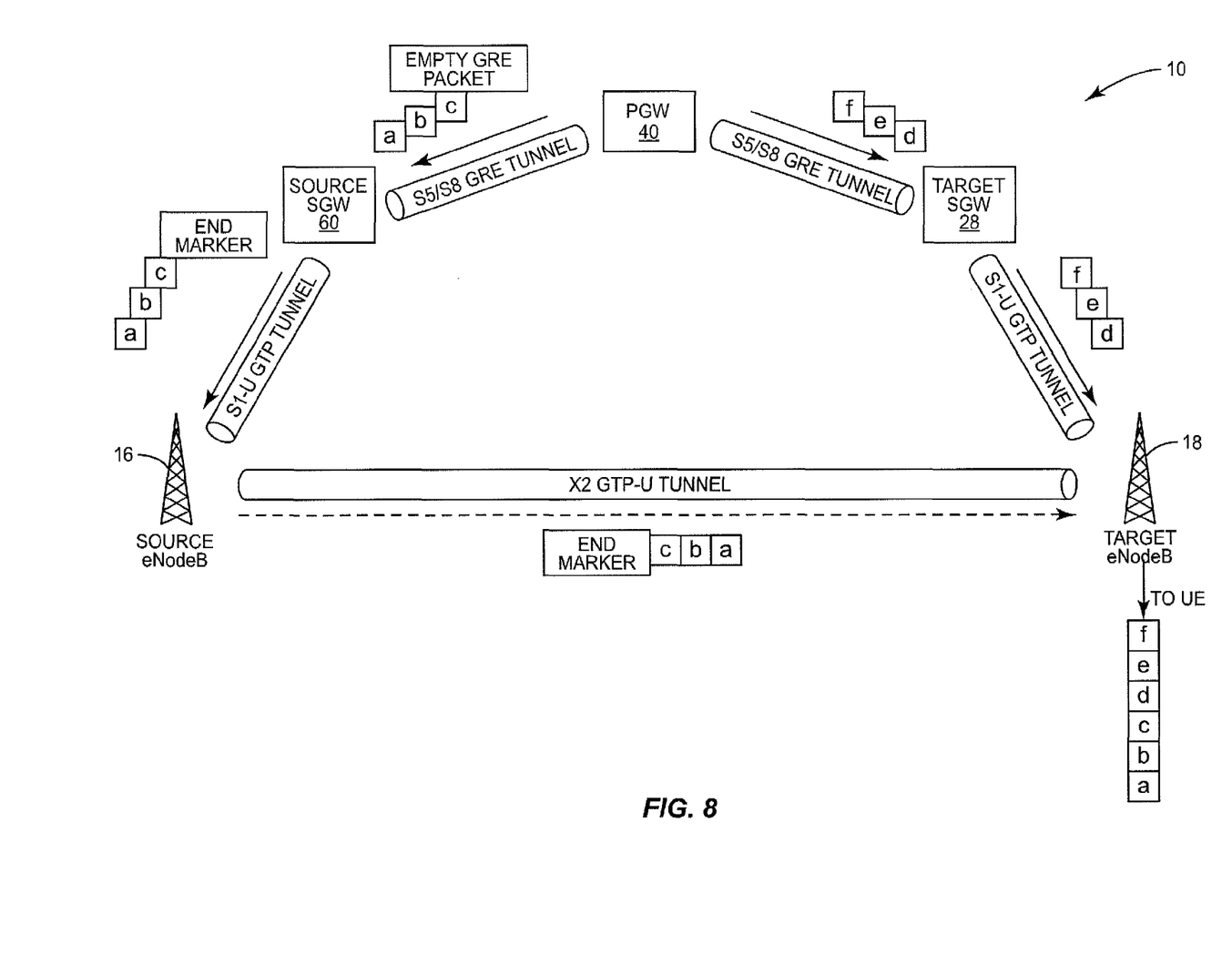
FIG. 8 is a functional block diagram of relevant portions of the LTE network of FIG. 1, depicting direct data packet forwarding for a handover with SGW relocation.

FIG. 8 depicts an inter-EUTRAN handover with SGW relocation according to embodiments of the present invention, when a direct forwarding path exists from the source eNodeB 16 to the target eNodeB 18. Initially, the PGW 40 sends user payload packets a, b, and c to the source SGW 60 via the S5/S8 GRE tunnel. Upon handover, the PGW 40 terminates data packet transmission to the source SGW 60. After sending the last data packet (data packet c), the PGW 40 generates and sends an empty GRE packet for each UE session. The example in FIG. 8 depicts one UE session with a single bearer and one empty GRE packet. The source SGW 60 sends the user payload packets a, b, and c to the source eNodeB 16 via the S1-U GTP tunnel. In response to the empty GRE packet, the source SGW 60 generates and sends to the source eNodeB 16 an end marker packet.

Because the source eNodeB 16 has already disconnected from the UE 20, the source eNodeB 16 forwards the data packets a, b, and c, followed by the end marker packet, to the target eNodeB 18, on the X2 interface.

After handover, the PGW 40 directs data packets d, e, and f to the target SGW 28 via the S5/S8 GRE tunnel. The target SGW 28 then forwards the packets d, e, and f to the target eNodeB 18. The target eNodeB 18 transmits the forwarded data packets a, b, and c to the newly attached UE 20. In response to the end marker packet, the target eNodeB 18 then transmits post-handover data packets d, e, and f. The UE 20 hence receives all data packets from the target eNodeB 18 in the proper order.

Figure 9:
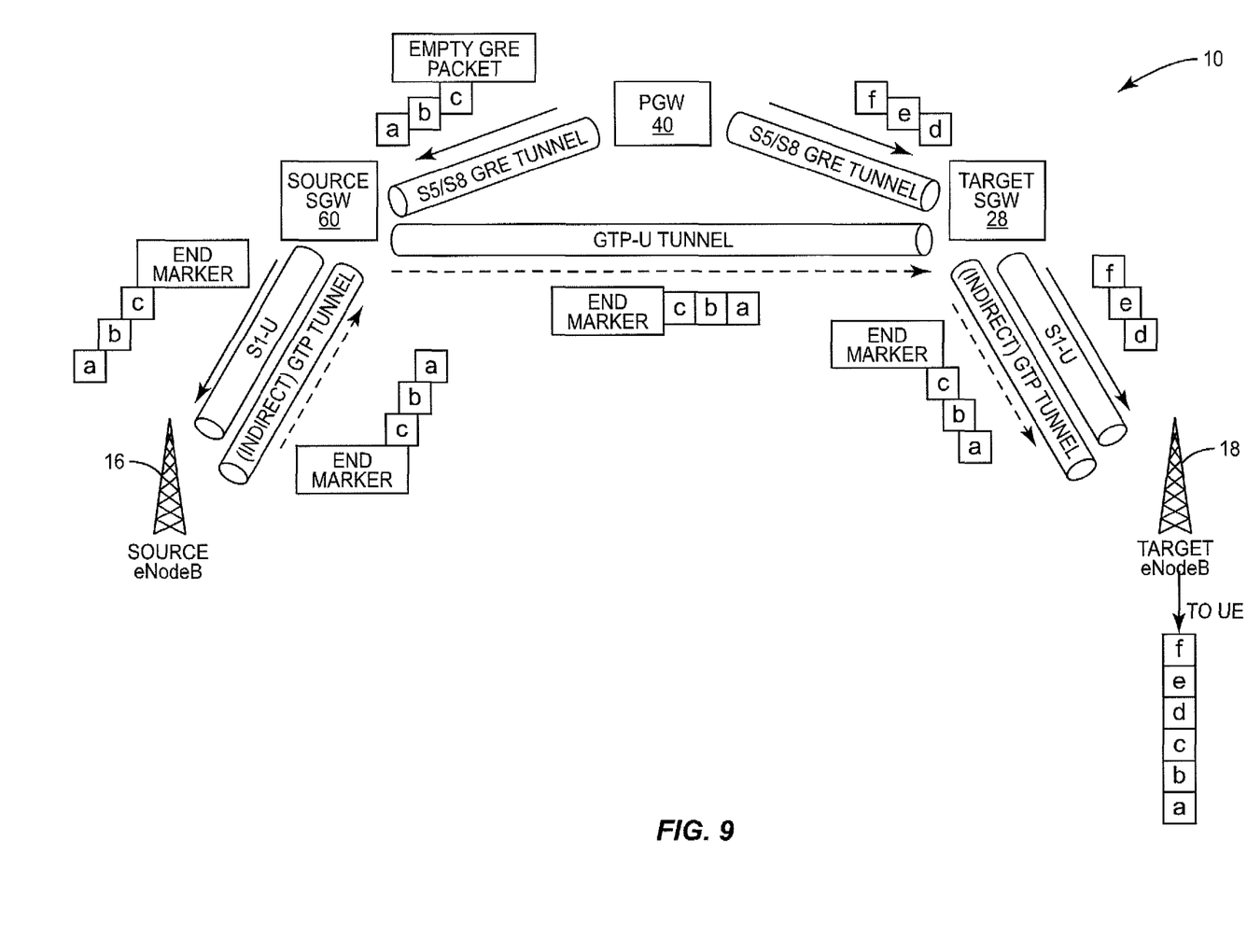
FIG. 9 is a functional block diagram of relevant portions of the LTE network of FIG. 1, depicting indirect data packet forwarding for a handover with SGW relocation.

FIG. 9 depicts an inter-EUTRAN handover with SGW relocation according to embodiments of the present invention, when no direct forwarding path exists from the source eNodeB 16 to the target eNodeB 18. Initially, as describe above, the PGW 40 sends user payload packets a, b, and c to the source SGW 60 via the S5/S8 GRE tunnel, followed by an empty GRE packet for the UE session. The source SGW 60 sends the user payload packets a, b, and c to the source eNodeB 16 via the S1-U GTP tunnel. In response to the empty GRE packet, the source SGW 60 generates and sends to the source eNodeB 16 an end marker packet for each bearer of the UE session.

Because source eNodeB 16 has already disconnected from the UE 20, and it has no direct forwarding path to the target eNodeB 18, the source eNodeB 16 returns user payload packets a, b, and c, followed by the end marker packet, to the source SGW 60 via an indirect GTP tunnel. The source SGW 60 then forwards data packets a, b, and c, and the end marker packet, to the target SGW 28 via a GTP-U tunnel. The target SGW 28 then sends the forwarded packets a, b, and c, the end market packet, and post-handover user payload packets d, e, and f received from the PGW 40, to the target eNodeB 18 via the S1-U interface. After the UE 20 attaches, the target eNodeB 18 transmits the user payload packets a, b, c, d, e, and f—in order—to the UE 20.

The embodiments disclosed herein ensure in-order delivery of user data packets during an intra-EUTRAN handover involving an SGW relocation (at least where the interface between the PGW 40 and source/target SGW 60, 28 is PMIP-GRE based). The embodiments are generic, and applicable for scenarios involving SGW relocation in both X2 based as well as S1-U based handover. The embodiments do not rely on any new changes either in the GTP-U header or the GRE packet header. It is within the framework of the existing messages and no new messages are proposed. Empty GRE packets are used to mimic the end marker packet functionality on interfaces for which end markers are not currently defined. Embodiments disclosed herein can be used for handovers involving GRE-to-GRE (user plane) tunnel switch (e.g., S5/S8 PMIP-GRE interface to S2a PMIP-GRE interface). In this case, the PGW 40 would transmit an empty GRE packet towards the source SGW 60 over the S5/S8 GRE tunnel before the tunnel switch. The source SGW 60 would then generate GTP-U end markers towards the source eNodeB 16 after receiving the empty GRE packet.

The intra-EUTRAN handover disclosed herein may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a source serving gateway (SGW) in a Long Term Evolution (LTE) wireless communication network, of ensuring in-order delivery of data packets for a session to User Equipment (UE) during intra-E-UTRAN handover involving relocation of the serving gateway function from the source SGW to a target SGW, wherein the interface between the network and at least one of the source SGW and the target SGW is based on Proxy Mobile IPv6 (PMIP) for the control plane, and Generic Routing Encapsulation (GRE) for the user plane, the method comprising:

receiving one or more data packets associated with a UE session from a core network node;

receiving an empty GRE packet from the core network node, the empty GRE packet indicating the end of the data packets associated with the UE session;

generating an end marker packet for each bearer of the UE session in response to the empty GRE packet; and sending the data packets, followed by the end marker packet, to a source eNodeB.

2. The method of claim 1 wherein the core network node is a packet data network gateway (PGW) node.

3. The method of claim 1 wherein the end marker packet comprises a GPRS Tunneling Protocol User data (GTP-U) protocol message type 254.

4. The method of claim 1 further comprising receiving the data packets and an end marker packet from the source eNodeB, and sending the data packets, followed by the end marker packet, to the target SGW.

5. The method of claim 4 wherein sending the data packets, followed by the end marker packet, to a target SGW comprises sending the data and end marker packets to the target SGW over a GTP-U tunnel.

6. A source serving gateway (SGW) in a Long Term Evolution (LTE) wireless communication network wherein the interface between the network and at least one of a handoff source SGW and target SGW is based on Proxy Mobile IPv6 (PMIP) for the control plane, and Generic Routing Encapsulation (GRE) for the user plane, the source SGW operative to deliver data packets for a session to a source eNodeB during intra-EUTRAN handover, the source SGW comprising:

a receiver operative to:
  receive one or more data packets associated with the session from a core network node; and
  receive an empty GRE packet from the core network node indicating the end of the data packets associated with the session;

a transmitter operative to transmit the data packets associated with the session to a source eNodeB; and a control unit operatively coupled to the transmitter and comprising a packet router operative to control the transmitter to transmit an end marker packet for each bearer of the session to the source eNodeB in response to the empty GRE packet.

7. The source SGW of claim 6 wherein the core network node is a packet data network gateway (PGW) node.

8. The source SGW of claim 6 wherein the end marker packet comprises a GPRS Tunneling Protocol User data (GTP-U) protocol message type 254.

9. The source SGW of claim 6 wherein the receiver is further operative to receive one or more data packets and an end marker packet from the source eNodeB.

10. The source SGW of claim 9 wherein the packet router is further operative to control the transmitter to transmit the data packets and end marker packet received from the source eNodeB, to a target SGW.

11. A method implemented by a packet data network gateway (PGW) in a Long Term Evolution (LTE) wireless communication network of transmitting downlink data packets for a User Equipment (UE) session to a UE during intra-EUTRAN handover involving a serving gateway (SGW) relocation, wherein the interface between the PGW and at least one of a handoff source SGW and target SGW is based on Proxy Mobile IPv6 (PMIP) for the control plane, and Generic Routing Encapsulation (GRE) for the user plane, the method comprising:

sending one or more data packets associated with the session to a source SGW;

receiving an indication of a handover of the UE;

sending one or more empty GRE packet indicating the end of the data packets associated with the session to the source SGW; and sending one or more data packets associated with the session to a target SGW.

12. The method of claim 11, wherein sending one or more empty GRE packet indicating the end of the data packets associated with the session to the source SGW comprises sending up to three empty GRE packets indicating the end of the data packets associated with the session to the source SGW.

13. The method of claim 12 wherein the empty GRE packets are sent with increasing delay between each transmission.

14. A packet data network gateway (PGW) in a Long Term Evolution (LTE) wireless communication network operative to deliver data packets for a session to a User Equipment (UE) during intra-EUTRAN handover involving serving gateway (SGW) relocation, wherein the interface between the PGW and at least one of a handoff source SGW and target SGW is based on Proxy Mobile IPv6 (PMIP) for the control plane, and Generic Routing Encapsulation (GRE) for the user plane, the PGW comprising:

a transmitter operative to:
  transmit one or more data packets associated the session to a source SGW;
  transmit one or more empty GRE packet indicating the end of the data packets associated with the session to the source SGW;
  transmit one or more data packets associated with the session to a target SGW;

a control unit coupled to the transmitter and comprising a packet router operative to control the transmitter to transmit the empty GRE packet to the source SGW and data packets associated with the session to the target SGW in response to receipt of an indication of handover of the UE.

15. The PGW of claim 14, wherein the packet router is further operative to control the transmitter to transmit up to three empty GRE packets to the source SGW in response to receipt of an indication of handover of the UE.

16. The PGW of claim 15 wherein the packet router is further operative to control the transmitter to transmit the empty GRE packets with increasing delay between each transmission.

* * * * *